United States Patent
Low

(10) Patent No.: US 7,081,828 B2
(45) Date of Patent: Jul. 25, 2006

(54) HEADS-UP DISPLAY FOR PROPELLER-DRIVEN AIRCRAFT

(75) Inventor: Thomas P. Low, Belmont, CA (US)

(73) Assignee: SRI International, Menlo Park, CA (US)

( * ) Notice: Subject to any disclaimer, the term of this patent is extended or adjusted under 35 U.S.C. 154(b) by 85 days.

(21) Appl. No.: 10/800,491

(22) Filed: Mar. 15, 2004

(65) Prior Publication Data

US 2004/0183696 A1    Sep. 23, 2004

Related U.S. Application Data

(60) Provisional application No. 60/456,103, filed on Mar. 17, 2003.

(51) Int. Cl.
*G08B 5/22* (2006.01)

(52) U.S. Cl. ............... 340/815.45; 340/945; 340/971; 340/980

(58) Field of Classification Search ........... 340/815.45, 340/950, 971, 975, 978, 980; 345/7, 30; 73/185, 187
See application file for complete search history.

(56) References Cited

U.S. PATENT DOCUMENTS

| 4,104,612 A | 8/1978 | Lowe |
| 4,453,163 A | 6/1984 | Garner et al. |
| 4,454,496 A | 6/1984 | Lowe |
| 4,743,903 A * | 5/1988 | Morley ............... 340/980 |
| 5,844,377 A | 12/1998 | Anderson et al. |
| 6,064,321 A | 5/2000 | Fort |
| 6,348,877 B1 * | 2/2002 | Berstis et al. ......... 340/980 |
| 6,486,858 B1 | 11/2002 | Altman |
| 6,496,760 B1 | 12/2002 | Michaelson et al. |
| 2003/0174504 A1 | 9/2003 | Tamaoki |

FOREIGN PATENT DOCUMENTS

| WO | WO 98/13814 | 4/1998 |
| WO | WO 01/93238 A1 | 12/2001 |

* cited by examiner

*Primary Examiner*—Toan N. Pham
(74) *Attorney, Agent, or Firm*—Guerin & Rodriguez, LLP; Michael A. Rodriguez

(57) ABSTRACT

Described is a heads-up display system for an aircraft having a rotating propeller within view of at least one occupant of the aircraft. The heads-up display system comprises a plurality of light-emitting elements disposed on a side of a propeller blade substantially facing at least one occupant of the aircraft. A graphics generator turns one or more of the light-emitting elements on the side of the propeller blade on and off in accordance with the rotation of the propeller to produce a graphical image that appears to at least one occupant of the aircraft to be superimposed on a background. The graphical image can be produced to conform to an object in the background upon which the graphical image is superimposed.

27 Claims, 6 Drawing Sheets

HEADS-UP DISPLAY FOR PROPELLER-DRIVEN AIRCRAFT

RELATED APPLICATION

This application claims the benefit of the filing date of U.S. Provisional Application, Ser. No. 60/456,103, filed Mar. 17, 2003, titled "Wide Area Heads Up Display for Propeller Driven Aircraft," the entirety of which provisional application is incorporated by reference herein.

FIELD OF THE INVENTION

The invention relates generally to aircraft and avionics. More particularly, the invention relates to a heads-up display for a propeller-driven aircraft.

BACKGROUND

Significant investment is flowing into the development of low-cost and simple-to-operate aircraft for personal transportation. Much effort has focused primarily upon developing new cockpit displays that simplify navigation and improve pilot situational awareness. Many of such in-cockpit displays present colorful, graphical representations of the information gathered by onboard instrumentation. The attractiveness of such displays, however, can distract the pilot and divert his attention away from outside the cockpit. Safety concerns attendant with a distracted pilot are evident.

Concerns with pilots looking down at the displays have led to the development of Heads-Up Display (HUD) technology. In general, HUD technology provides a graphical depiction of flight-critical information optically superimposed on a real-world background. With such information appearing on the real-world background, the focus of the pilot's attention remains outside of the cockpit. While looking outside, the pilot can see the information gathered by the aircraft's instrumentation, such as the position of other aircraft, current flight path direction, and navigation waypoints.

Many challenges have impeded wide-scale adoption of HUD technology in light aircraft, including the need for high-brightness displays, practical limitations in HUD system weight, limited field of view, and viewing angle limitations (i.e., narrow optical aperture) that make displays produced by the HUD system viewable only to the pilot. Moreover, current HUD systems are typically expensive and heavy, some systems weighing as much as 60 pounds. Further, the distance of the displayed information from the pilot's eyes is typically significantly shorter than the focal depth of the background, and thus optics are needed to enable the pilot to focus on the information and the background simultaneously. Accordingly, HUD systems have made little progress in being adopted in light aircraft. There remains, therefore, a need for a heads-up display technology that enables graphical information to be overlaid on the real-world background and avoids the aforementioned focal depth, field of view, size, weight, and cost disadvantages of present-day systems.

SUMMARY

In one aspect, the invention features a heads-up display system for an aircraft having a rotating propeller within view of at least one occupant of the aircraft. The heads-up display system comprises a plurality of light-emitting elements disposed on a side of a propeller blade substantially facing at least one occupant of the aircraft. A graphics generator controls illumination of one or more of the light-emitting elements on the side of the propeller blade accordance with the rotation of the propeller to produce a graphical image that appears to at least one occupant of the aircraft to be superimposed on a background.

In another aspect, the invention features an aircraft comprising a propeller having a plurality of propeller blades, an array of light-emitting elements disposed on a side of one or more of the propeller blades, and a graphics generator controlling illumination of one or more of the light-emitting elements in the array of light-emitting elements disposed on the side of one of the propeller blades in accordance with a rotation of the propeller to produce a display of a graphical image.

In yet another aspect, the invention features a propeller comprising a propeller blade, a plurality of light-emitting elements disposed on a side of the propeller blade, and a spinner having a graphics generator in communication with the plurality of light-emitting elements to control illumination of one or more of the light-emitting elements in accordance with a rotation of the propeller.

In still another aspect, the invention features an apparatus for use in a craft having a rotating propeller. The apparatus comprises a light source disposed on a side of a blade of the propeller, means for determining a current rotational position of the propeller, and means for controlling illumination of the light source based on the current rotational position of the propeller.

In still yet another embodiment, the invention features a method of producing a heads-up display for an aircraft with a rotating propeller. A plurality of light-emitting elements is provided on a side of a propeller blade. A current rotational position of the propeller is determined, and illumination of the plurality of the light-emitting elements is controlled based on the current rotational position of the propeller.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a heads-up display (HUD) system for a propeller-driven aircraft, preferably a single-engine forward-mounted propeller-driven aircraft. In brief overview, the HUD system of the invention includes light-emitting elements disposed on one side of at least one propeller blade. The side of the propeller blade having the light-emitting elements faces the cockpit of the aircraft so that one or more occupants of the cockpit, i.e., the pilot and typically a copilot, can see the light-emitting elements when they become illuminated. The light-emitting elements are bright enough for each occupant to see their illumination in sunlight.

The HUD system of the invention makes use of the principle of the persistence of vision. The human eye continues to perceive an image briefly after the image has vanished. Timed activation and deactivation of specific light-emitting elements on the propeller blades, performed in synchronization with the rotation and phase of the propeller, causes at least one high-resolution, stable graphical image to appear in front of the cockpit in the plane of the propeller disk. The image can approach the size of the propeller disk itself, subtending a significant portion of the pilot's forward field of view. The rapid rotation of the propeller renders the propeller blades invisible to an aircraft occupant, so each generated graphical image appears to the occupant to be suspended and superimposed on the real-world background. The occupants can simultaneously observe the displayed graphical images without having to wear special headgear or equipment. As described in more detail below, each occupant may see the same graphical image as or a different graphical image than the other.

Because the light-emitting elements are located on the propeller blades, which, for several types of aircraft, can be approximately 8 to 12 feet distant from the cockpit, the occupant can simultaneously bring into focus the generated graphical image and the real-world background. Further, the distance of the rotating propeller blades from the cockpit and their circumferential span achieve a field of view (FOV) that, for some types of aircraft, such as the Cessna Caravan, approximates 46°.

Although one propeller blade alone can be sufficient to produce a graphical image, multiple propeller blades operate to refresh the displayed graphical image and to provide a failsafe should the lighting mechanism for one propeller blade fail. Capable of replacing or augmenting current cockpit displays, the HUD system of the invention is lightweight and inexpensive, particularly in comparison with current HUD technology. Safety is improved through the improved situational awareness achieved through the use of augmented reality displays. Beneficiaries of the invention include pilots and passengers traveling in the aircraft, and the public at large, from the improved air transportation safety.

Figure 1:
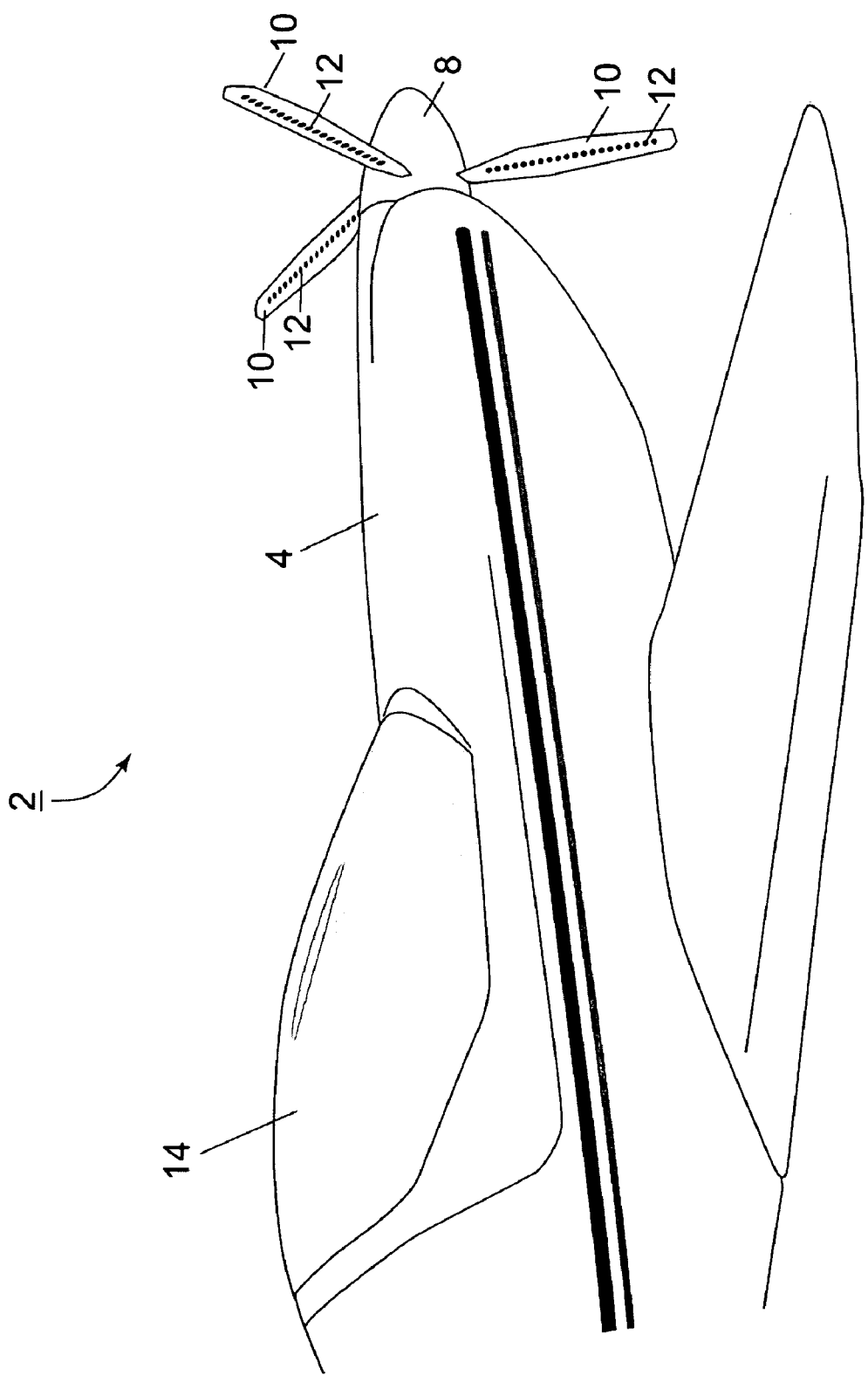
FIG. 1 is a schematic diagram of a front end of an aircraft embodying the heads-up display of the present invention.

FIG. 1 shows a front end of an exemplary aircraft 2 embodying the HUD system of the invention. The aircraft 2 includes an engine 4 for rotating a propeller 6 mounted on the aircraft's nose. The propeller 6 includes a hub (not shown), a conical spinner 8, and a plurality of propeller blades 10 mounted to and radiating from the hub. Examples of propeller-driven general aviation aircraft in which the HID system can be installed include, but are not limited to, a Cessna 172, a Piper Saratoga, a Cirrus SR-22, and a Lancair Columbia. Although described herein with reference to a propeller with three propeller blades 10, the invention can be practiced with as many propeller blades 10 as there are on the propeller 6 of the aircraft 2.

Disposed on one side of each propeller blade 10 is a set of light-emitting elements 12. The light-emitting elements 12 can be, for example, mounted on the surface of the propeller blade 10 or embedded within a groove in the propeller blade 10. Although FIG. 1 shows light-emitting elements 12 on all propeller blades 10, the principles of the invention can be practiced with light-emitting elements 12 on fewer than all blades (e.g., on just one propeller blade). Generally, the light-emitting elements 12 are placed on the propeller blade 10 where they are visible to an occupant of the cockpit 14 (e.g., to the pilot, copilot, or to both). Here, for example, each set of light-emitting elements 12 extends lengthwise along a portion of the propeller blade 10 in a line array. The arrangement of the light-emitting elements 12 may also account for any twist in the shape of the propeller blade 10. Other array arrangements of light-emitting elements 12 can be used without departing from the principles of the invention. The light-emitting elements 12 can be encased in an abrasion-resistant, aerodynamic, transparent housing. Electrical wires for controlling illumination of the light-emitting elements run inside or outside, (or both) along the propeller blade 10 to various electronics housed in the spinner, described in more detail below.

In one embodiment the light-emitting elements 12 are light-emitting diodes or LEDs. The particular LEDs used in the HUD system can vary in their radiation patterns (i.e., effective beam angles), colors, and intensities. For example, Luxeon III produces a LED that produces a wide beam of light (a 140° beam angle) at 75,000 mcd (millicandelas). Wide-beam LEDs enable displayed graphical images to be seen simultaneously by each occupant in the cockpit 14. Other LEDs, such as the RY-501NBC844, emit a narrow beam of light (e.g., a 20° beam angle) at a lesser brightness (13,000 mcd). Graphical images produced by illuminating narrow-beam LEDs can be directed so that one occupant of the cockpit within the radiation pattern sees the image while another occupant outside of the radiation pattern does not. These narrow-beam and wide-beam LEDs are sufficiently bright to be visible in daylight and can be dimmed at night to avoid blinding the pilot. Also, LEDs are available in various colors. Accordingly, the HUD system can use any combination of the various colors to display multicolor graphical images. In another embodiment, the light-emitting elements 12 are organic light-emitting diodes (OLEDs). OLEDs are capable of wide viewing angles (up to approximately 160°) in bright light. Hereafter, the terms LEDs and light-emitting elements may be used interchangeably, although it is to be understood that LEDs and OLEDs are specific examples of light-emitting elements.

Figure 2:
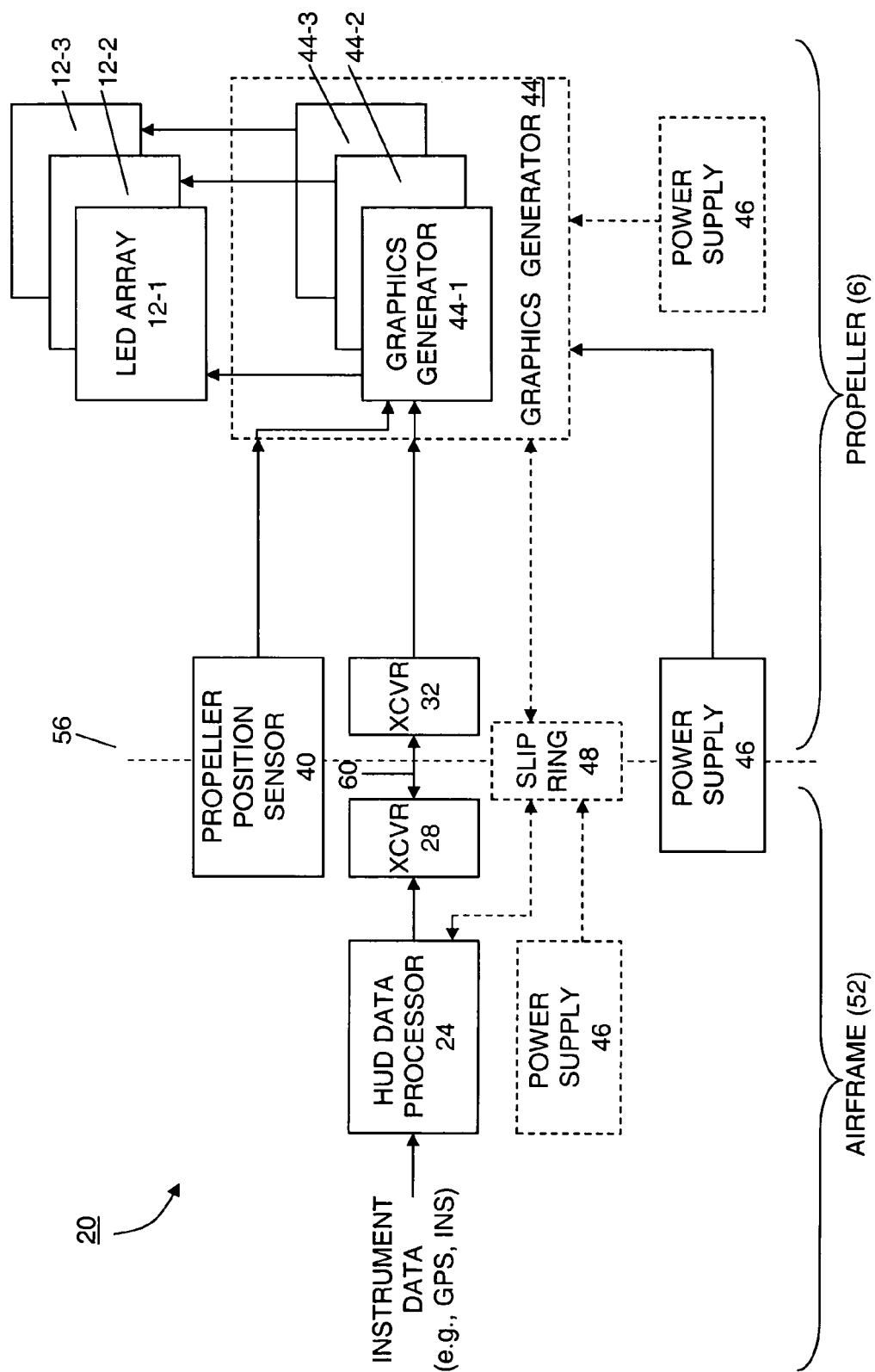
FIG. 2 is a functional block diagram of an embodiment of a heads-up display system of the present invention.

FIG. 2 shows a functional block diagram of an embodiment of a HUD system 20, constructed in accordance with the invention, for use in the propeller-driven aircraft 2. The HUD system 20 includes a HUD data processor 24, a first transceiver 28, a second transceiver 32, a propeller-position sensor 40, a graphics generators 44, and a power supply 46. The graphics generator 44 may include a plurality of graphics generator subunits 44-1, 44-2, and 44-3. Each graphics generator subunit is in communication with a corresponding set of light-emitting elements 12-1, 12-2, and 12-3 on one of the propeller blades 10. Some embodiments, described in more detail below, also include a slip ring 48 (drawn in phantom to indicate another embodiment).

Some portions of the HUD system 20 are embodied in the airframe 52 of the aircraft 2, other portions are embodied in the rotating propeller 6, and still other portions have a stationary component and a rotating component (these are shown straddling the dashed line 56). More specifically, the HUD data processor 24 and first transceiver 28 are part of the airframe 52 (e.g., within the instrument panel of the cockpit 14 of FIG. 1). The second transceiver 32 and graphics generator 44 are part of the rotating propeller 6, housed within the spinner 8. The propeller-position sensor 40, the power supply 46, and, for some embodiments, the slip ring 48 have a stationary airframe component and rotating propeller component. Other embodiments (shown in phantom) have the power supply 46 either fully with the airframe 52 or with the propeller 6.

Communication between the HUD data processor 24 on the airframe 52 and the graphics generator 44 in the rotating propeller 6 can occur in one embodiment wirelessly or in another embodiment by wire. In the wireless embodiment, the first and second transceivers 28, 32 exchange signals, including communications from the HUD data processor 24, over a wireless communication channel 60. Technologies for communicating wirelessly include, but are not limited to, infrared (IR), visible optical, and radio frequency (RF). In general, any part of the electromagnetic spectrum can be used to accomplish the wireless communication. For wired embodiments, shown in phantom, the HUD data processor 24 on the airframe 52 and the graphics generator 44 are in communication through the slip ring 48, which exchanges electrical signals between wires in the stationary airframe 52 and the appropriate wires in the rotating propeller 6.

The HUD data processor 24 is in communication with various aircraft instrumentation to receive electrical signals corresponding to data gathered or measurements made by such instrumentation. For example, the HUD data processor 24 may be in communication with an Inertial Navigation System (INS) having various sensors (e.g., accelerometers and gyroscopes) for tracking and controlling the position and orientation of the aircraft 2. As another example, a Global Positioning System (GPS) can supply geographical location information to the HUD data processor 24. The HUD data processor 24 can be configured to receive signals from other types of navigation systems than those described (e.g., the Attitude Heading and Reference System or AHARS and an air data processor for measuring airspeed and barometric altitude).

The HUD data processor 24 executes program code for determining the information content, appearance, and display location of the graphical image to be produced by the activation and deactivation of the LEDs during the rotation of the propeller 6. The resulting graphical image to be displayed is typically based on the information obtained from the aircraft sensors. The program code produces one or more commands to be interpreted by the graphics generator 44 to generate this graphical image. Each command passes from the HUD data processor 24 to the first transceiver 28 for transmission to the second transceiver 32 over the communication channel 60. Preferably the communication channel 60 is a low bandwidth channel (e.g., a serial data channel); accordingly, the commands can be defined using a high-level abstraction. For example, a command of "H=090" and "A=5000" can mean that the heading of the aircraft 2 is East at an altitude of 5000 feet. Alternatively, the slip ring 48 conveys the commands to the graphics generator 44.

The propeller-position sensor 40, in general, determines the rotation rate and phase of the propeller 6 so that the graphics generator 44 can modulate the electrical signals controlling LED illumination of the light-emitting elements 12 at the appropriate moments during the rotation of the propeller 6, to cause the display of the graphical image. The graphics generator 44 can also determine the brightness of each light-emitting-element 12 that is illuminated. In one embodiment, the propeller-position sensor 40 measures the rate of rotation and produces an electrical signal or pulse each time the propeller 6 is in a specific position (e.g., a "zero" reference position). The activating and deactivating of the light-emitting elements 12 are then timed from the moment the propeller 6 is in the zero position, in accordance with this rate of rotation, to produce the graphical image at the appropriate positions within each revolution of the propeller 6.

In another embodiment, the propeller-position sensor 40 measures the instantaneous position of the propeller 6, producing thousands of pulses for a single revolution of the propeller 6, with each pulse representing a different angular position in the revolution. (The actual number of pulses determines the granularity with which the instantaneous position can be identified. The finer the granularity, the more precisely known is the instantaneous position of the propeller, and the less reliance there is on knowing the rate of rotation for operating the light-emitting elements.) This embodiment is suited for piston-driven propellers that do not necessarily rotate at a uniform rate within a single revolution because each time a piston fires there is an impulse of force causing instantaneous acceleration and subsequent deceleration until the next piston firing.

Depending upon the particular embodiment, the output generated by the propeller-position sensor 40 can be a series of pulses or an encoded signal representing the instantaneous position of the propeller. As an example of the series of pulses, consider that the propeller-position sensor 40 generates a pulse for every degree of revolution of the propeller 6. In such an instance, 360 pulses occur for each revolution of the propeller 6. The instantaneous position of the propeller 6 can then be determined by a current pulse count (with reference to a zero position). This example is merely illustrative; more or fewer pulses can occur for each rotation.

Example implementations of the propeller-position sensor 40 include, but are not limited to, a photo-interrupter, and a hall-effect sensor, or an inductive proximity sensor (e.g., Pepperl & Fuchs NJ5-11-N inductive proximity sensor). Preferably, the rotating component of the propeller-position sensor 40 is the position-sensing component, so that pulses or encoded signals generated for representing the detected propeller position can pass directly to the graphics generator 44 without having to pass from the stationary airframe 52 to the rotating propeller 6.

Each graphics generator subunit 44-1, 44-2, and 44-3 includes a first input terminal for receiving commands issued from the HUD data processor 24 by way of the transceivers 28, 32, and a second input terminal for receiving an encoded signal or electrical pulses issued from the propeller-position sensor 40. From signals arriving on these input terminals, each graphics generator subunit 44-1, 44-2, and 44-3 determines, for its corresponding propeller blade 10, if and when each light-emitting element 12 is activated (on) and deactivated (off) during each revolution of the propeller 6. Activating light-emitting elements can include determining the brightness of the light-emitting elements (LEDs can have different levels of brightness, not just on and off settings). In one embodiment, the graphics generator subunits determine the particular pattern of LED illumination on its corresponding propeller blade independently of the other graphics generator subunits. In another embodiment, a single graphics generator 44 controls the pattern of illumination for all propeller blades 10.

The power supply 46 supplies power to the various electronics on the rotating propeller 6, including the propeller-position sensor 40, graphics generator 44, and light-emitting element arrays 12. In one embodiment, the power supplied by the power supply 46 is generated from the rotational movement of the propeller 6 through the use of stationary magnets and rotating coils. The power is distributed directly from the rotating component of the power supply 46 to the various electronics. Accordingly, a slip ring is not needed to transfer the generated power to the propeller 6, although the slip ring 48 may be used to transfer commands issued from the HUD data processor 24, as described above.

In another embodiment, the power supply 46 resides on the airframe 52. In this embodiment, the slip ring 48 transfers the power to the electronics in the rotating propeller 6. In yet another embodiment, the power supply 46 resides in the rotating propeller 6, for example, as one or more batteries, and supplies power to the electronics directly. Here, the slip ring 48 is not used to transfer power to the electronics in the propeller 6, although the slip ring 48 may be used to transfer commands issued from the HUD data processor 24.

Figure 3:
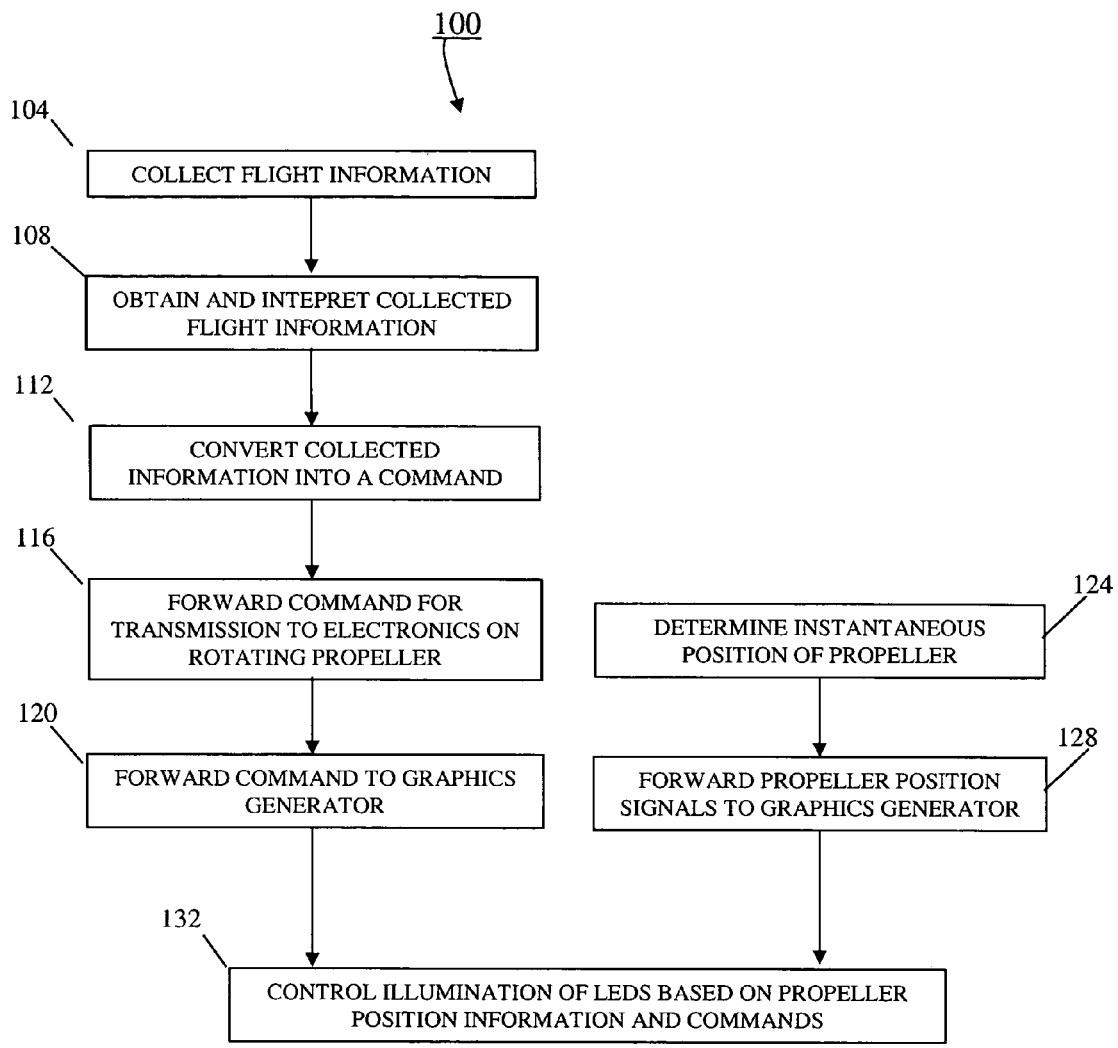
FIG. 3 is a flow diagram of an embodiment of a process for generating a graphical image in accordance with the invention.

FIG. 3 shows an embodiment of a general process 100 performed by the HUD system 20 for displaying a graphical image in accordance with the invention. In the description of the process 100, reference is made also to FIG. 2. The particular order in which the steps of the process 100 are numbered and described is exemplary. The operation of the HUD system of the invention is not limited to this particular order.

At step 104, the various sensors in the aircraft continuously collect information for distribution to the appropriate cockpit instrumentation. Examples of such information include, but are not limited to, heading, attitude, angle of attack, slip, barometric pressure, altitude, air temperature, air speed, and geographic location. The HUD data processor 24 receives and interprets (step 108) the collected information, converts (step 112) the information into one or more commands understood by the graphics generator 44, and forwards (step 116) each command to the first transceiver 28 for transmission to the second transceiver 32. The transmission of each command between the first and second transceivers 28, 32 can involve a handshaking protocol (i.e., transmissions with acknowledgement). The second transceiver 32 forwards (step 120) each command received from the first transceiver 28 to the graphics generator 44.

Concurrent with and independently of the operation of the HUD data processor 24, the propeller-position sensor 40 continuously determines (step 124) the instantaneous position of the propeller 6 (or its rate of rotation and phase) and provides (step 128) signals to the graphics generator 44 indicative of the currently determined propeller position.

In response to the propeller-position signals from the sensor 40 and the command from the HUD data processor 24, the graphics generator 44 activates and deactivates (step 132) certain ones of the light-emitting elements to produce one or more graphical images. In general, the generated graphical image is associated with the type of information represented by the command. This graphical image can be alphanumeric information or diagrammatic information, such as boxes, lines, circles, stars, and other types of symbology. In one embodiment, the displayed graphical images comply with MIL-STD-1787, which describes a standard for an aircraft display symbology.

In one embodiment, the displayed graphical image is conformal to the background; that is, the graphical image conforms to the shape of an object or objects in the background over which that graphical image is superimposed. For example, a displayed graphical image can outline an airport runway as the aircraft makes a final approach for landing. As another example, the displayed graphical image is a line that conforms to the horizon. Typically, wide-beam LEDs are used to produce conformal graphical images because such LEDs emit light that can be seen at any point in the rotation of the propeller blade 10 by each occupant of the aircraft (except when the airframe 52 blocks the line of sight). Generally, the distance of the occupants from the propeller blades 10 is sufficient to render insignificant the effects of parallax on the precision of the conformity observed by each occupant viewing the same conformal graphical image.

Figure 4:
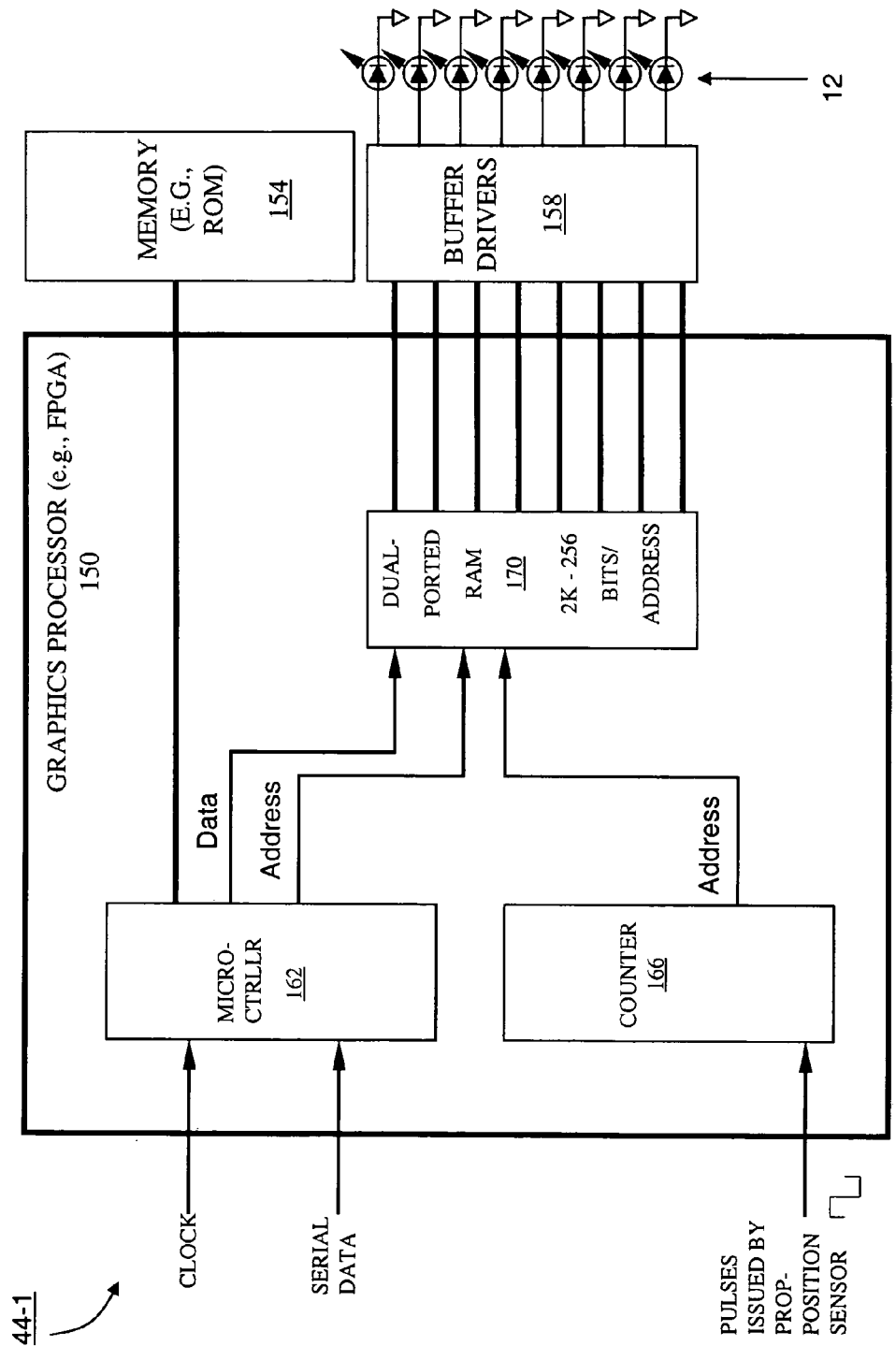
FIG. 4 is a functional diagram of an embodiment of a graphics generator for producing heads-up display graphical images in accordance with the principles of the invention.

FIG. 4 shows an embodiment of the graphics generator sub-unit 44-1 of FIG. 2, as a representative example of each graphics generator sub-unit. The circuitry described herein is exemplary; other circuits can be used to practice the principles of the invention. The graphics generator sub-unit 44-1 includes a graphics processor 150 (embodied in, for example, a field programmable gate array or FPGA), persistent memory 154 (e.g., ROM) for storing data and program code, and buffer drivers 158. In this embodiment, the graphics processor 150 includes a microcontroller 162 (e.g., Motorola 68HC12BE32), a counter 166, and random-access memory or RAM 170 (e.g., a dual-port RAM such as Cypress CY7C133, manufactured by Cypress Semiconductor). The FPGA can have other components than those described herein and perform other functions for the aircraft that are related or unrelated to the generation of graphical images.

The microcontroller 162 includes a data input terminal for receiving commands issued from the HUD data processor 24 and a clock input terminal for receiving clock pulses that control the rate of the microcontroller's operation. The microcontroller 162 is also in communication with the persistent memory 154 from which to obtain program code stored therein. By execution of the program code, the microcontroller 162 interprets the commands received on the data input terminal and, based on these commands, generates address and data signals for one port of the RAM 170, into which is stored the appropriate LED-illumination patterns.

The counter 166 includes an input terminal for receiving signals representing the instantaneous position of the propeller 6 as determined by the propeller-position sensor 40. Based on these signals, the counter 166 generates address signals for a second port of the RAM 170. For embodiments in which the propeller-position sensor 40 is an absolute encoder, that is, the sensor 40 produces an encoded binary value representing the propeller's position rather than electrical pulses, the counter 166 is unnecessary. In such embodiments, the encoded binary value passes to the RAM 170.

The RAM 170 includes two sets of input terminals. A first set of input terminals is in electrical communication with the microcontroller 162 to receive address and data signals therefrom, and a second set of input terminals is in electrical communication with the counter 166 to receive address signals therefrom. A set of output terminals of the RAM 170 is in electrical communication with buffer drivers 158 for activating and deactivating the LEDs 12 on a propeller blade 10.

The address locations of the RAM 170 have a one-to-one correspondence with the various positions of the propeller blade 10 at which one or more LEDs can be activated. The RAM 170 stores a bitmap of the graphical image or images to be displayed. Unlike X-Y bitmaps commonly associated with computer display screens, the bitmap provided by the RAM has radius (R) and theta ($\Theta$) coordinates. The data values stored at each of the address locations determines which LEDs 12 are illuminated, and which LEDs 12 are not, at each identified propeller blade position during a revolution of the propeller. More specifically, each address location has a certain number of bits, and each bit corresponds to one of the LEDs 12 on the propeller blade 10. For example, if a propeller blade 10 has 256 LEDs and each address location has 256 bits, then the data value stored at a particular address location determines the illumination status of each LED. If all bits at a given address location are set to a bit value of 1 (and, for example, a 1 bit value signifies activation), then accessing this address location to read its data contents causes all 256 LEDs 12 on the propeller blade 10 to be illuminated.

Each address location is also associated with a rotational position of the propeller 6 (based on a predetermined reference point, e.g., the $0^{th}$ address location corresponding to the zero position on the propeller). Consider, for exemplary purposes only, that the RAM 170 has 360 address locations, and that each address location corresponds to a different angular position of the propeller 6 over the course of one full revolution. Then, each address location corresponds to 1° of rotation (provided the 360° of revolution are divided equally, for example, among the angular positions).

The operation of each graphics generator subunit 44-1 is illustrated by the following example. The microcontroller 162 receives at its data input terminal a command from the HUD data processor 24. Commands arrive asynchronously and independently of the rotation of the propeller 6. The microcontroller 162 executes program code to interpret the command and produce the appropriate action in response. Based on the particular command, the microcontroller 162 determines which bits of each address location are set to a 1 bit value and which bits are set to a 0 bit value. For example, consider that the command is for displaying a line when the propeller blade 10 has rotated 90° from the zero position. As used in this example, the zero position of the propeller blade 10 is along a horizontal axis of the aircraft defined from one wingtip to the other wingtip. A 90° rotation from the zero position, as used in this example, places the propeller blade 10 in a vertical position in front of the pilot with respect to the horizontal axis. In response to the command, the microcontroller 162 causes all one bit values to be written at the $90^{th}$ address location and zero bit values to be stored at all other address locations (referring again to the above example in which the 360 address locations represents a 1° increment of revolution).

Independently of the operations being performed by the microcontroller 162, the counter 166 maintains a count that increments by one for each electrical signal or pulse received from the propeller-position sensor 40. The count wraps around to zero after the maximum count is reached, i.e., after the last address location in the RAM 170 is accessed. Each different count represents a different angular position of the propeller 6 and determines which physical address location of the RAM 170 is accessed. Accordingly, while the propeller 6 rotates, the RAM 170 is continuously scanned in succession from the first address location to the last. The scan causes the data contents stored at each address location to appear at the output terminals of the RAM 170 to determine which LEDs are turned on and which LEDs are turned off.

Returning to the example of displaying a vertical line, while the count in the counter 166 is between 0 and 89, inclusive, the RAM 170 is outputting all zero values because all bits of the address locations 0 through 89 are set to zero. As a result, the LEDs 12 are off. When the count reaches 90, the data contents of the $90^{th}$ address location are output. At the $90^{th}$ address location all bits are set to one, and as a result all corresponding LEDs 12 become activated. Activation of all LEDs 12 at the 90° propeller position causes a graphical image of a vertical line to appear.

This illumination is momentary, for upon the next incrementing of the counter 166, the $91^{st}$ address location is accessed. At this address location all bits are set to zero, and, as a result, all LEDs 12 become deactivated again. Accordingly, the duration for which the LEDs are illuminated corresponds to the time taken to transition from the $90^{th}$ address location to the $91^{st}$ address location. In general, this period of time is sufficiently long for an occupant to perceive the graphical image. To improve perception of the graphical image, the LEDs 12 on the other propeller blades 10 can be similarly illuminated to refresh the vertical line when each blade 10 reaches its 90° position.

The LEDs 12 remain deactivated until the propeller 6 returns again to the 90° position. One or more LEDs may become activated sooner if the microcontroller 162 writes bit values of 1 to other address locations before the propeller returns to the 90° position.

Figure 5:
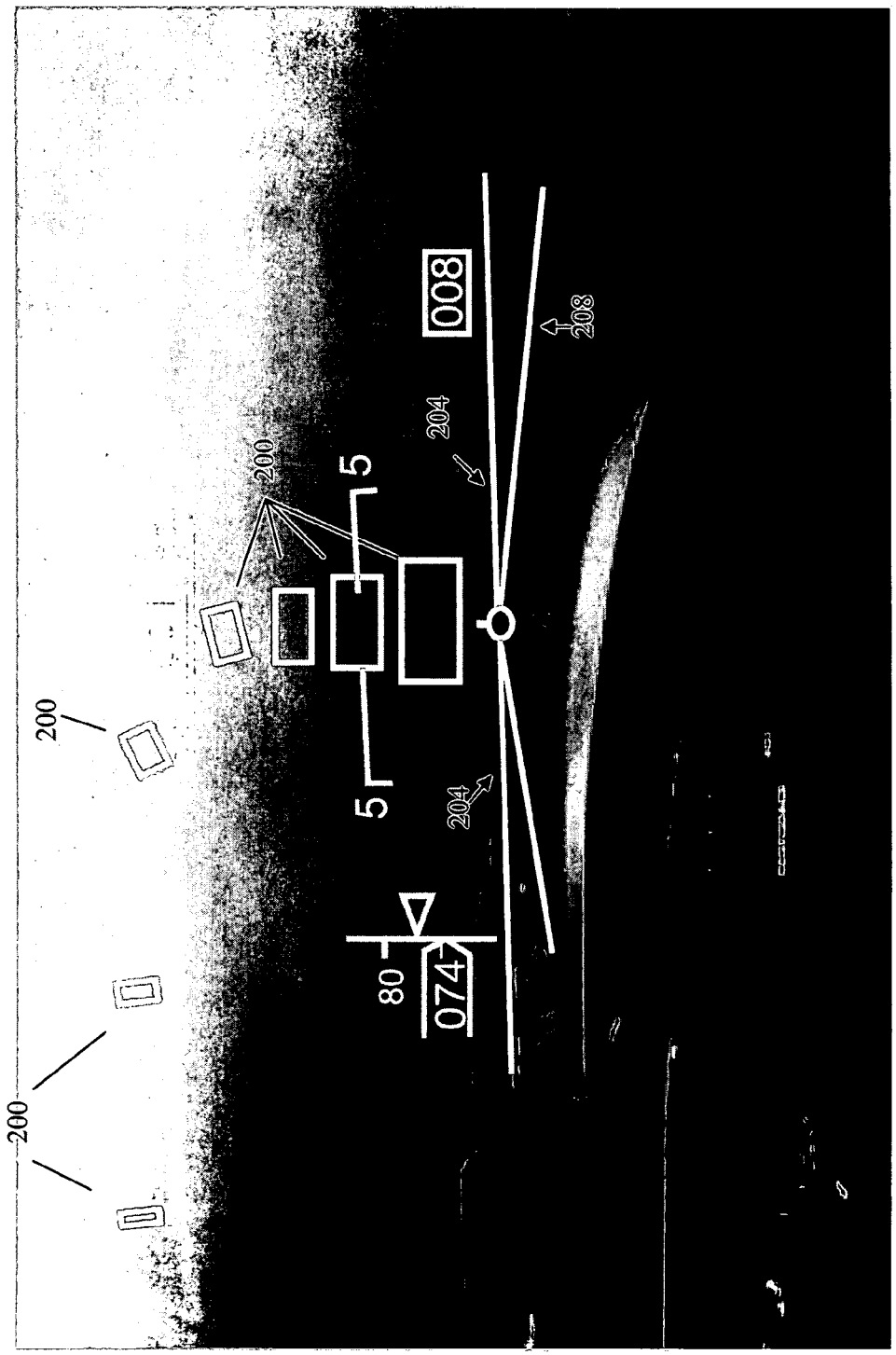
FIG. 5 is a view from the cockpit of an aircraft at an exemplary heads-up display that could operate to portray a "highway-in-the-sky."

FIG. 5 shows an exemplary heads-up display that may be produced by the HUD system 20 of the invention. This display is from the viewpoint of an occupant of the aircraft cockpit. In this example, the displayed graphical images are a series of transparent rectangles 200 banking upwards toward the left. The arrangement of the rectangles causes the larger rectangles to appear closer to the aircraft than the smaller rectangles, although the rectangles are equidistant from the cockpit. The series of rectangles form a "highway in the sky" or HITS. While the pilot guides the aircraft "through" the rectangles, the HUD system 20 continuously updates the series of rectangles being displayed. Also seen in FIG. 5 are examples of conformal graphical images. Graphical images 204 conform to the horizon, and graphical images 208 conform to the landing strip.

Figure 6:
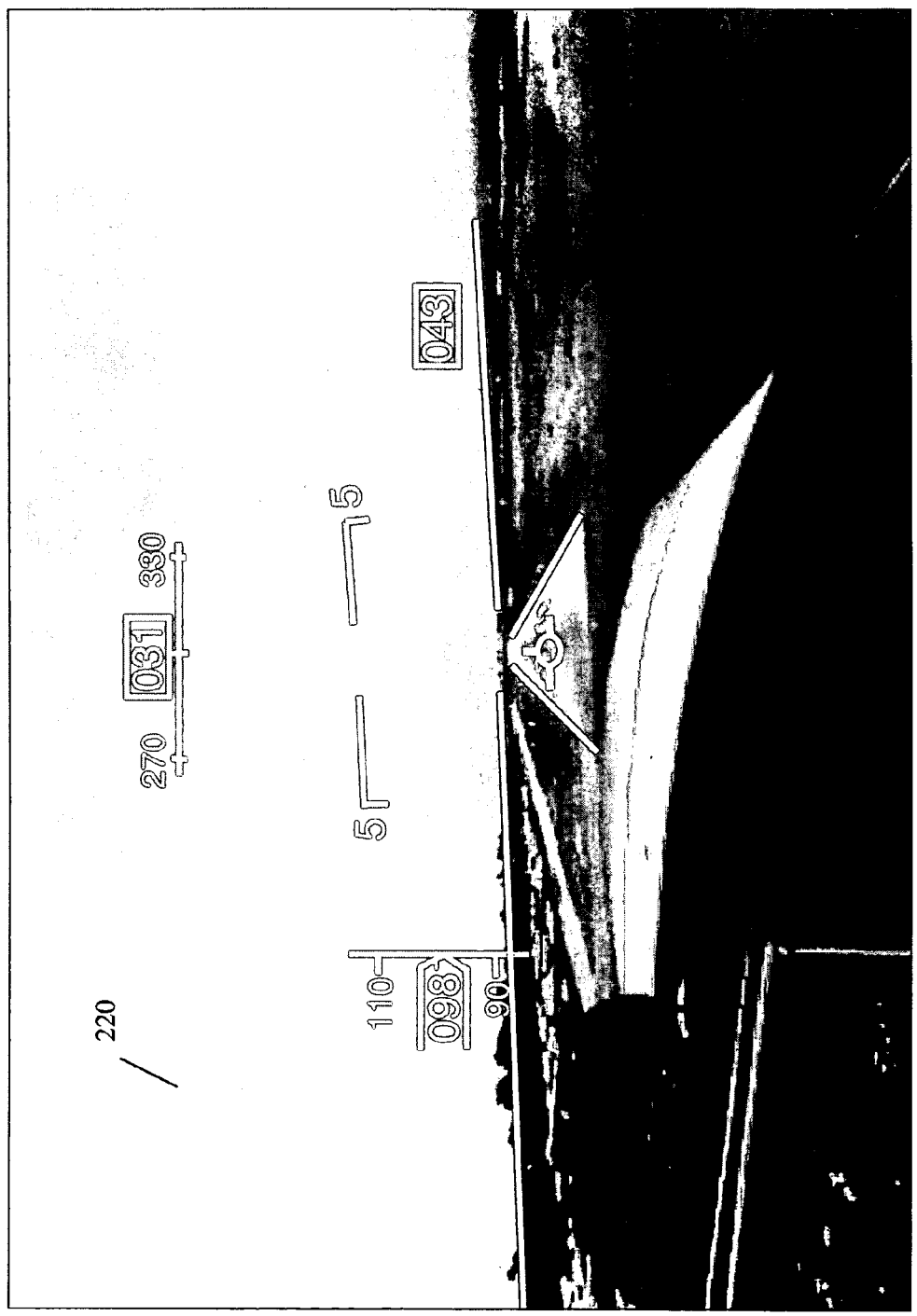
FIG. 6 is a view from the cockpit of an aircraft at an exemplary heads-up display that could operate to provide an advanced warning of other aircraft in the forward vicinity.

FIG. 6 shows another example of a heads-up display from the viewpoint of an occupant in the aircraft cockpit that may be produced by the HUD system 20 of the invention. Here, the heads-up display could operate as a collision-avoidance system. When the aircraft sensors detect another aircraft in the forward vicinity, the HUD system 20 displays a graphical image in the general direction of the other aircraft. The particular graphical image, such as a red star 220, is designed to alert an occupant of the aircraft. As a result, the pilot, passenger, or both are notified of the aircraft's presence in advance of actually seeing it.

Although the invention has been shown and described with reference to specific preferred embodiments, it should be understood by those skilled in the art that various changes in form and detail may be made therein without departing from the spirit and scope of the invention as defined by the following claims. For example, in an alternate embodiment, a two-dimensional graphical image is generated on a small stationary display, and a linear array of photosensitive elements rotating with the propeller scans the stationary device. There is a correspondence between elements in the photosensitive array and the light-emitting elements array such that the presence of a light signal on the photosensitive element causes the corresponding light-emitting element to turn on.

As another example, light-emitting elements can be disposed on a side of the propeller blade facing away from the cockpit. In this example, the graphical image being generated is visible, not to the occupants of the cockpit, but rather to those observing the aircraft, such as oncoming air traffic.

In this instance, the generation of the graphical image can serve as a warning indicator or as an identifier of the aircraft. The use of forward-facing light-emitting elements can also supplement the HUD system described above. Moreover, for embodiments in which the graphical image is intended for outside observers, the propeller does not need to be in front of the cockpit (e.g., propellers mounted to the wings).

What is claimed is:

1. A heads-up display system for an aircraft having a rotating propeller assembly with at least one propeller blade within view of at least one occupant of the aircraft, the heads-up display system comprising:
   a plurality of light-emitting elements disposed on a side of the propeller blade substantially facing at least one occupant of the aircraft; and
   a graphics generator disposed in the rotating propeller assembly, the graphics generator controlling illumination of one or more of the light-emitting elements on the side of the propeller blade in accordance with the rotation of the propeller assembly to produce at least one graphical image that appears to at least one occupant of the aircraft.

2. The heads-up display system of claim 1, wherein the at least one graphical image conforms to an object in the background upon which that graphical image is superimposed.

3. The heads-up display system of claim 1, wherein one of the light-emitting elements, when illuminated, produces a narrow beam of light that is visible to each occupant within a radiation pattern of the light and is unseen by each occupant outside of the radiation pattern.

4. The heads-up display system of claim 1, wherein one of the light-emitting elements, when illuminated, produces a wide beam of light visible simultaneously to multiple occupants of the aircraft with a view of the propeller blade.

5. The heads-up display system of claim 1, further comprising a data processor obtaining information from aircraft sensors and generating a command based on the information for use in generating the graphical image.

6. The heads-up display of claim 1, further comprising a communication channel between a processor in an airframe of the aircraft and the graphics generator of the propeller assembly for transferring signals between the processor and the graphics generator.

7. The heads-up display of claim 6, wherein the communication channel is a wireless channel.

8. The heads-up display of claim 6, wherein the communication channel is a wired channel.

9. The heads-up display of claim 8, wherein the communication channel includes a slip ring.

10. The heads-up display of claim 1, further comprising a processor translating electrical signals obtained from a sensor of the aircraft into a command to be sent to the graphics generator for producing the graphical image.

11. The heads-up display of claim 1, further comprising an electrical power source supplying power to the graphics generator.

12. The heads-up display of claim 11, wherein the electrical power source for supplying power to the graphics generator in the rotating propeller assembly is disposed within the rotating propeller assembly and derives the supplied power from the rotation of the propeller assembly.

13. The heads-up display of claim 1, wherein the propeller blade is a first propeller blade, and further comprising a second plurality of light-emitting elements disposed on a side of a second propeller blade of the propeller substantially facing at least one occupant of the aircraft and emitting light in accordance with the rotation of the propeller assembly to produce at least one graphical image that appears to at least one occupant to be superimposed on the background.

14. The heads-up display of claim 13, wherein the at least one graphical image produced by the second plurality of light-emitting elements is redundant to the at least one graphical image produced by the plurality of light-emitting elements on the first propeller blade.

15. The heads-up display of clam 1, wherein the graphics generator includes a plurality of graphics generator subunits, each graphics generator subunit corresponding to a different propeller blade of the propeller assembly and controlling illumination of one or more light-emitting elements on that propeller blade.

16. An aircraft, comprising:
   a propeller assembly having a plurality of propeller blades, the propeller assembly rotating during the aircraft's operation;
   an array of light-emitting elements disposed on a side of one or more of the propeller blades; and
   a graphics generator in the rotating propeller assembly, the graphics generator controlling illumination of one or more of the light-emitting elements in the array of light-emitting elements disposed on the side of one of the propeller blades in accordance with a rotation of the propeller assembly, to produce a display of a graphical image.

17. The aircraft of claim 16, further comprising a processor obtaining information from aircraft instrumentation and sending a command based on the information to the graphics generator over a communication channel to control the display of the graphical image.

18. The aircraft of claim 17, wherein the communication channel is a wireless channel or a wired channel.

19. The aircraft of claim 16, further comprising an electrical power generator being disposed within the rotating propeller assembly and generating from the rotation of the propeller assembly power that is supplied to the graphics generator.

20. The aircraft of clam 16, wherein the graphics generator includes a plurality of graphics generator subunits, each graphics generator subunit corresponding to a different one of the propeller blades of the propeller assembly and controlling illumination of one or more light-emitting elements disposed on a side of that propeller blade.

21. A propeller, comprising:
   a propeller blade;
   a plurality of light-emitting elements disposed on a side of the propeller blade; and
   a spinner having a graphics generator in communication with the plurality of light-emitting elements to control illumination of one or more of the light-emitting elements in accordance with a rotation of the propeller.

22. The propeller of claim 21, further comprising a propeller-position sensor determining a current angular position of the propeller and communicating the current angular position to the graphics generator.

23. The propeller of clam 21, further comprising at least a second propeller blade with a plurality of light-emitting elements disposed on a side of the second propeller blade, and wherein the graphics generator includes a plurality of graphics generator subunits, each graphics generator subunit corresponding to a different propeller blade of the propeller and controlling illumination of one or more light-emitting elements disposed on a side of that propeller blade.

24. An apparatus for use in a craft having a rotating propeller, the apparatus comprising:

a light source disposed on a side of a blade of the propeller;

means for determining a current rotational position of the propeller; and means, disposed on the rotating propeller, for controlling illumination of the light source based on the current rotational position of the propeller.

25. The apparatus of claim 24, further comprising means for generating power from the rotation of the propeller and providing the generated power to the means for controlling illumination of the light source.

26. A method of producing a heads-up display for an aircraft having an airframe and a rotating propeller assembly, the method comprising:

providing a plurality of light-emitting elements on a side of a propeller blade;

determining a current rotational position of the propeller assembly; and transmitting a command from the airframe to the rotating propeller assembly;

controlling, at the rotating propeller assembly, illumination of the plurality of the light-emitting elements based on the command and the current rotational position of the propeller assembly.

27. The method of claim 26, further comprising obtaining information from instrumentation of the aircraft, and generating the transmitted command based on the obtained information.

* * * * *